O. C. FRICK.
SHEAR BAR ANCHOR FOR FEED CUTTERS.
APPLICATION FILED AUG. 18, 1919.
1,404,518.
Patented Jan. 24, 1922.
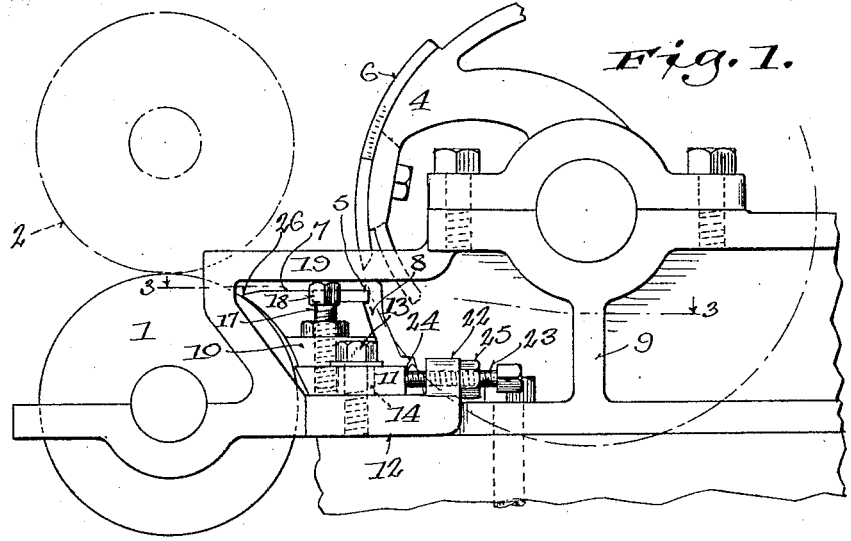
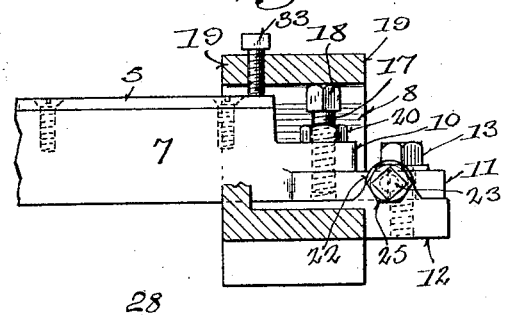
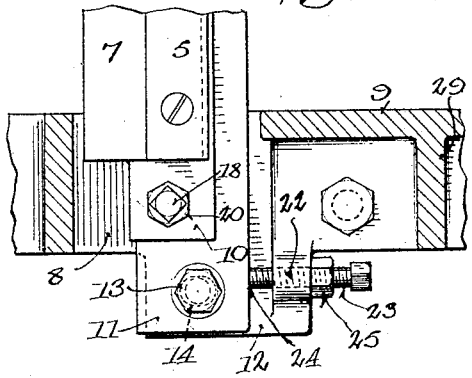
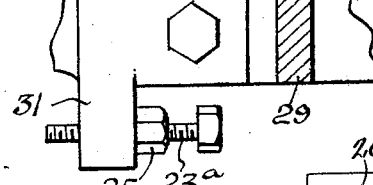
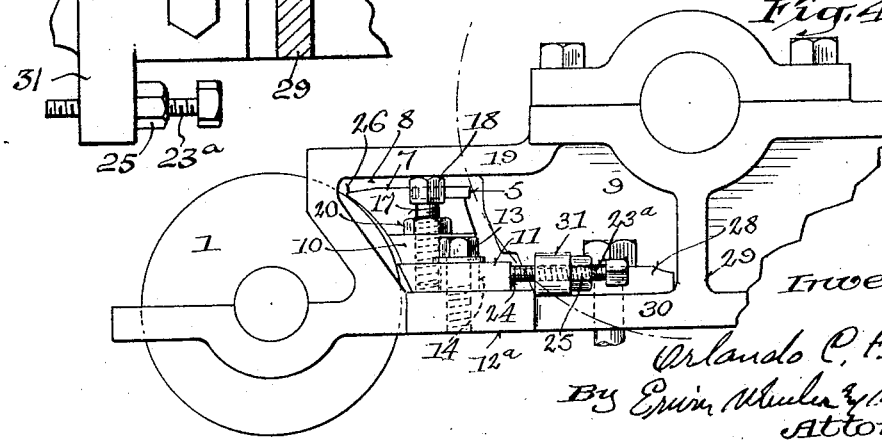
Inventor
Orlando C. Frick
By Erwin Wheeler & Woolard
Attorneys.

UNITED STATES PATENT OFFICE.

ORLANDO C. FRICK, OF MANITOWOC, WISCONSIN, ASSIGNOR TO SMALLEY MANUFACTURING COMPANY, OF MANITOWOC, WISCONSIN, A CORPORATION OF WISCONSIN.

SHEAR-BAR ANCHOR FOR FEED CUTTERS.

1,404,518.  Specification of Letters Patent. Patented Jan. 24, 1922.

Application filed August 18, 1919. Serial No. 318,107.

*To all whom it may concern:*

Be it known that I, ORLANDO C. FRICK, a citizen of the United States, residing at Manitowoc, county of Manitowoc, and State of Wisconsin, have invented new and useful Improvements in Shear-Bar Anchors for Feed Cutters, of which the following is a specification.

My invention relates to improvements in shear bar anchors for feed cutters.

The object of my invention is to provide adequate means for securing the shear bar mounting to the frame of the machine, and holding it in a desired position of adjustment on the frame, with such rigidity that the shear bar cannot be pushed into the path of the cutter knives.

In a feed cutter, the shear bar mounting serves also as a feed plate, over which material passes from between the feed rollers to the cutter knives. With certain classes of material there is a tendency for portions thereof to wedge in between the lower feed roller and the shear bar mounting, in such a manner as to crowd the latter, or the upper portion thereof, toward the feed cutter knives until the latter strike the shear bar.

It is the object of my invention to provide means for so anchoring the shear bar mounting that no change in the adjustment will be possible under pressures exerted by the material, or any substances wedging in between the feed roller and the mounting.

In the drawings:—

Figure 1 is a fragmentary side view of the working portions of a feed cutter, with parts removed to show the means for anchoring the shear bar mounting to that portion of the frame generally known as the pillow block.

Figure 2 is a detail view showing one end portion of the mounting in its relation to the frame, the latter being illustrated in vertical section, exposing the mounting and its anchors, the mounting being viewed from the front side.

Figure 3 is a plan view, showing the frame in horizontal section, drawn generally on line 3—3 of Figure 1.

Figure 4 is a view similar to Figure 1, but showing a slight modification.

Figure 5 is a fragmentary, sectional view illustrating in plan a portion of the structure shown in Figure 4.

Like parts are identified by the same reference characters throughout the several views.

1 and 2 are the feed rollers of a feed cutter of ordinary type, provided with a rotating cutter head 4, operating in connection with a shear bar 5, over which the material is delivered to the cutter blades 6 carried by the cutter head, the feed rollers being employed to press the material together and deliver it across the shear bar 5.

The shear bar 5 is secured in a recess or groove formed in the upper surface of a mounting 7, as may be seen from Fig. 1, the ends of which project into a recess or opening 8 in the frame 9. The ends of the mounting 7 are provided with projecting flanges or ears 10, which overlap the upper surface of an adjustable plate 11. The plate 11 is secured to the frame at the base of the aperture 8, or to a projecting flange 12, by a bolt 13. This bolt may pass through a slot or elongated aperture 14 in the adjusting plate 11, whereby the plate 11 may be adjusted forwardly or backwardly by loosening the bolt 13.

The projecting ear or flange 10 at each end of the mounting 7 may be made integrally with the adjusting plate 11, as shown in the drawings, or may be made separate therefrom and connected thereto by a screw or bolt 17, which may have threaded engagement not only in the flange 10, but also in the plate 11. In either form of construction this bolt 17 is of sufficient length to serve as a brace when adjusted with its head 18 in contact with the overhanging ledge 19 on the frame, i. e., with the top wall of the aperture 8. A lock nut 20 is preferably employed to hold this bolt or screw 17 in position after the desired adjustment has been made, and the bolt or screw 17 turned backwardly in its threaded bearing, until its head 18 engages the ledge 19.

In order to securely lock the adjusting plate 11 in the desired position of adjustment, I not only clamp it down to the flange 12, or on the frame by means of the bolt 13, but I also provide the flange 12 with an upwardly projecting lug 22, through which a bolt 23 passes with its inner end bearing upon the rear margin of the adjusting plate 11, as shown at 24. This bolt 23 not only braces the plate 11 but also may be used to adjust such plate; said bolt being held in adjusted position by a locking nut 25.

From the above description, it will be understood that the adjusting plate 11 is not only clamped to the frame by the clamping bolt 13, but it is braced against rearward movement in the direction of the rotary cutter head by the bracing bolt 23, and the bolt 17 is utilized as a brace or bracing bolt, which, by its bearing upon the overhanging ledge 19 of the frame, prevents the mounting from being tilted in the direction of the cutter head, under pressures exerted at its front margin 26 by the feed roller 1, and any material tending to wedge between the feed roller and this margin 26. The bracing bolt 23 prevents any accidental change in the adjustment, and relieves some of the strains upon the clamping bolt 13 such for instance, as tensile strains due to the tipping tendency of the mounting, and shearing strains from the wedging of material between the roller 1 and the mounting 7. The bracing bolt 17 also relieves the strain upon the clamping bolt 13 by preventing tipping or tilting movements of the mounting. This bolt 17 is peculiarly effective for the above described purposes, since it is located in front of the clamping bolt 13, i. e., nearer to the feed roller 1, and therefore any tendency of the mounting to tilt is resisted primarily by the bracing bolt 17 and the overhanging ledge 19.

It will, of course, be understood that both ends of the shear bar mounting 7 are secured in the manner above described, the working portion of the shear bar being between these points of support.

In applying my invention to frames of machines in use, or in cases where my invention is to be applied to any machine not provided with an integral lug 22 on the frame base, I employ the construction illustrated in Figure 4. The frame 9 illustrated in Figure 4, is of ordinary type in common use so far as the integral portions thereof are concerned, such frames having projecting flanges or ledges 12ª, but without upwardly extending projections, such as the projection 22 disclosed in Figure 1. I have therefore provided an attachment in the form of a substantially L-shaped bar or bracket 28, adapted to fit against the reenforcing rib 29 on the frame, and upon the base 30 thereof, with one arm 31 of this bracket projecting outwardly in a position to receive a bracing bolt 23ª similar to the bracing bolt 23 disclosed in Figure 1, the inner end of this bracing bolt being adapted to bear upon the adjusting plate 11, which is, of course, constructed and arranged as above described with reference to Figure 1. All of the other parts may be substantially identical with those disclosed in Figure 1, and are therefore indicated by the same reference letters throughout.

I claim:—

1. The combination with a feed cutter having side frames provided with recesses having upper and lower walls, a shear bar, and cooperating knives; of a shear bar mounting comprising a main portion adapted to receive said shear bar and provided with slotted end plates adapted to rest upon the lower walls of said recesses; a set of bolts passing through said slots and threadably engaging said side frames to adjustably clamp said plates thereto; a second set of bolts having threadable engagement with said side frames and bearing upon edge faces of said plates to both adjust and brace said plates against sliding motion; and a third set of bolts threadably engaging said mounting and having projecting ends bearing upon the upper walls of said recesses to firmly brace said mounting against tilting.

2. The combination with a feed cutter having side frames provided with recesses having upper and lower walls, a shear bar, and co-operating knives; of a shear bar mounting comprising a main portion adapted to receive such shear bar and provided with end plates adapted to rest upon the lower walls of said recesses; means for securing said end plates to said side frames in adjusted position, means for adjusting said end plates to thereby adjust the shear bar with reference to the co-operating knives; and adjustable means projecting upwardly from said shear bar mounting and adapted to engage the under surface of the upper portion of said recesses to thereby prevent tilting of said shear bar mounting.

In testimony whereof I affix my signature in the presence of two witnesses.

ORLANDO C. FRICK.

Witnesses:
EDNA LIPPERT,
EDNA BRAUNEL.